United States Patent
Knauer et al.

(10) Patent No.: US 11,273,878 B2
(45) Date of Patent: Mar. 15, 2022

(54) ACTIVE WHEEL AIR DEFLECTOR ARRANGEMENT

(71) Applicant: Magna Exteriors GmbH, Sailauf (DE)

(72) Inventors: Bernd Knauer, Stuttgart (DE); Stefan Kleinfeld, Cologne (DE); Braendon Lindberg, Oxford, MI (US)

(73) Assignee: MAGNA EXTERIORS GMBH, Sailauf (DE)

(*) Notice: Subject to any disclaimer, the term of this patent is extended or adjusted under 35 U.S.C. 154(b) by 0 days.

(21) Appl. No.: 16/931,511

(22) Filed: Jul. 17, 2020

(65) Prior Publication Data
US 2021/0016845 A1 Jan. 21, 2021

(30) Foreign Application Priority Data

Jul. 19, 2019 (DE) .................. 102019210771.0

(51) Int. Cl.
 *B62D 35/00* (2006.01)
 *B62D 35/02* (2006.01)

(52) U.S. Cl.
 CPC ........... *B62D 35/02* (2013.01); *B62D 35/005* (2013.01)

(58) Field of Classification Search
 CPC ....... B62D 35/00; B62D 35/005; B62D 35/02
 USPC .......................................... 296/180.1, 180.3
 See application file for complete search history.

(56) References Cited

U.S. PATENT DOCUMENTS

| | | | |
|---|---|---|---|
| 10,518,827 B2 | 12/2019 | Ibañez Moreira et al. | |
| 2015/0239511 A1* | 8/2015 | Reuvekamp | B29D 5/00 296/180.1 |
| 2019/0168826 A1* | 6/2019 | Wolf | B62D 35/005 |
| 2019/0233025 A1* | 8/2019 | Mitidieri | B62D 35/02 |
| 2020/0010128 A1* | 1/2020 | Herlem | B62D 35/005 |

FOREIGN PATENT DOCUMENTS

| | | | |
|---|---|---|---|
| DE | 3741048 A1 | 7/1989 | |
| DE | 102009014368 A1 | 9/2010 | |
| DE | 102015012874 A1 | 3/2017 | |
| DE | 102016206118 A1 | 11/2017 | |
| DE | 102017214769 A1 | 2/2019 | |
| EP | 3154845 B1 | 8/2018 | |
| FR | 2858793 A1 | 2/2005 | |
| JP | H04237686 A | 8/1992 | |
| JP | 05105124 A * | 4/1993 | ............. B62D 37/02 |
| JP | 3094575 B2 | 10/2000 | |
| WO | 2017098106 A1 | 6/2017 | |
| WO | 2017103357 A1 | 6/2017 | |
| WO | 2017153662 A1 | 9/2017 | |
| WO | 2018109311 A1 | 6/2018 | |

OTHER PUBLICATIONS

German Search Report from the German Patent Office for related German Application No. 102019210771.0 dated Feb. 14, 2020, 6 pages.

* cited by examiner

*Primary Examiner* — Jason S Daniels

(74) *Attorney, Agent, or Firm* — Dickinson Wright PLLC

(57) ABSTRACT

An active wheel air deflector arrangement for attachment to a motor vehicle, which comprises at least one actuator, wheel air deflectors for the front wheels of the motor vehicle, and swivelable holders for the wheel air deflectors, wherein the wheel air deflectors are reversibly mounted on the holder.

14 Claims, 2 Drawing Sheets

ACTIVE WHEEL AIR DEFLECTOR ARRANGEMENT

CROSS-REFERENCE TO RELATED APPLICATIONS

Figure 1:
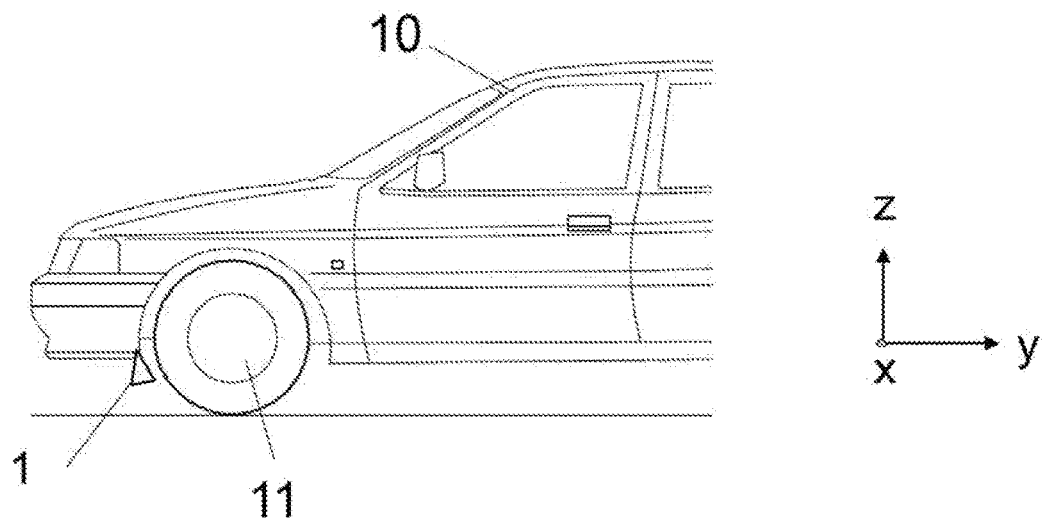

This application claims priority to DE 102019210771.0 filed Jul. 19, 2019. The entire disclosure of the above application is incorporated herein by reference.

FIELD OF THE INVENTION

The present invention relates to an active wheel air deflector arrangement for attachment to a motor vehicle, which comprises at least one actuator, wheel air deflectors for the front wheels of the motor vehicle, and swivelable holders for the wheel air deflectors.

BACKGROUND OF THE INVENTION

This section provides information related to the present disclosure which is not necessarily prior art.

With respect to vehicles, there is a considerable loss of the aerodynamic efficiency, in particular due to the air flow under and around a vehicle. Conventional designs, such as fixed plates or fixed air deflectors made of flexible materials, are known and do not meet the desired requirements. Fixed air deflectors are still a compromise, since they cannot be brought to the optimal height in order to fulfill their function without becoming damaged during travel with low ground clearance. Therefore, active front air deflector assemblies were developed, of the type described in EP 3 154 845 B1. In this related art, an assembly that extends along the width of the vehicle is designed to be swivelable.

However, there is not only a desire for an improved active front deflector, which offers an aerodynamic surface for improved aerodynamics during use, which can be moved under predefined conditions, but also the desire for a wheel air deflector.

JP3094575 B2 describes extendable flaps at the wheel wells for improving the mileage of an automobile at high speed. In the process, a gear wheel is driven by a motor, in order to drive a toothed bar and, in this way, lower or raise flaps. The flap is nondetachably connected to its fixture.

In the case of damage exclusively of the wheel air deflector, the wheel air deflector as well as its holder must be replaced, which results in increased repair costs.

WO2017/098 106 A1 describes a wheel air deflector system, which is attached to the vehicle with the aid of a fixed frame. A swivelable flow shell is mounted within the frame, which is swiveled with the aid of an internal drive comprising a friction wheel or a toothed bar about an axis connected to the frame. The frame is not swivelable and comprises no connecting elements to the flow shell.

DE 10 2017 214 769 A1 describes a wheel spoiler device, which is controlled with the aid of a four-bar mechanism. Multiple swivel axes are utilized in this case. The flow body is swivelably connected to a connecting area.

DE 10 2015 012 874 A1 describes an air guide device comprising a ratchet rail including a plurality of detent elements and an inner part connected thereto via appropriate detent elements.

DE 10 2016 206 118 A1, DE 10 2009 014 368 A1, and DE 37 41 048 A1 describe connections of components to the vehicle, which comprise different connecting mechanisms.

Upon utilization of the active wheel air deflector arrangement on other vehicles and bumper/underbody contours, both the wheel air deflector as well as the holder must be adapted to the vehicle type.

One object of the invention is to provide a wheel air deflector comprising a holder, which is replaceable at its holder and, nevertheless, is attached in a stable manner.

SUMMARY OF THE INVENTION

This section provides a general summary of the disclosure, and is not a comprehensive disclosure of its full scope or all of its features.

The object is achieved with the aid of an active wheel air deflector arrangement for attachment to a motor vehicle, which comprises at least one actuator, wheel air deflectors for the front wheels of the motor vehicle, and swivelable holders for the wheel air deflectors, wherein the wheel air deflectors are reversibly mounted on the holder.

The swivelable wheel air deflector, which is located on the front side of the vehicle under the body, is capable of changing the aerodynamics of the vehicle. The wheel air deflector deflects the air flow on the front side of the vehicle at the front wheel, in order to improve the aerodynamics of the vehicle either with respect to the fuel consumption or the performance features.

Due to the above-described connection approaches, a utilization of the standard system on further vehicle models is made possible simply by replacing the wheel air deflector.

Advantageously, the holder comprises attachments along an upper edge of the wheel air deflector. The holder comprises appropriate formations, which following the contour of the upper edge of the wheel air deflector.

One advantageous embodiment is implemented in that the attachments in the holder are formed by recesses comprising a ridge and an integrated spring.

The attachments take place via engagement of tabs of the wheel air deflector into the recesses, wherein the tab comprises a projection and a stop.

One further alternative embodiment comprises perforated tabs at the upper edge of the wheel air deflector and the holder comprises curved seats including slots.

For the purpose of attachment, expanding rivets are inserted through the hole of the perforated tab and the slot of the curved seat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
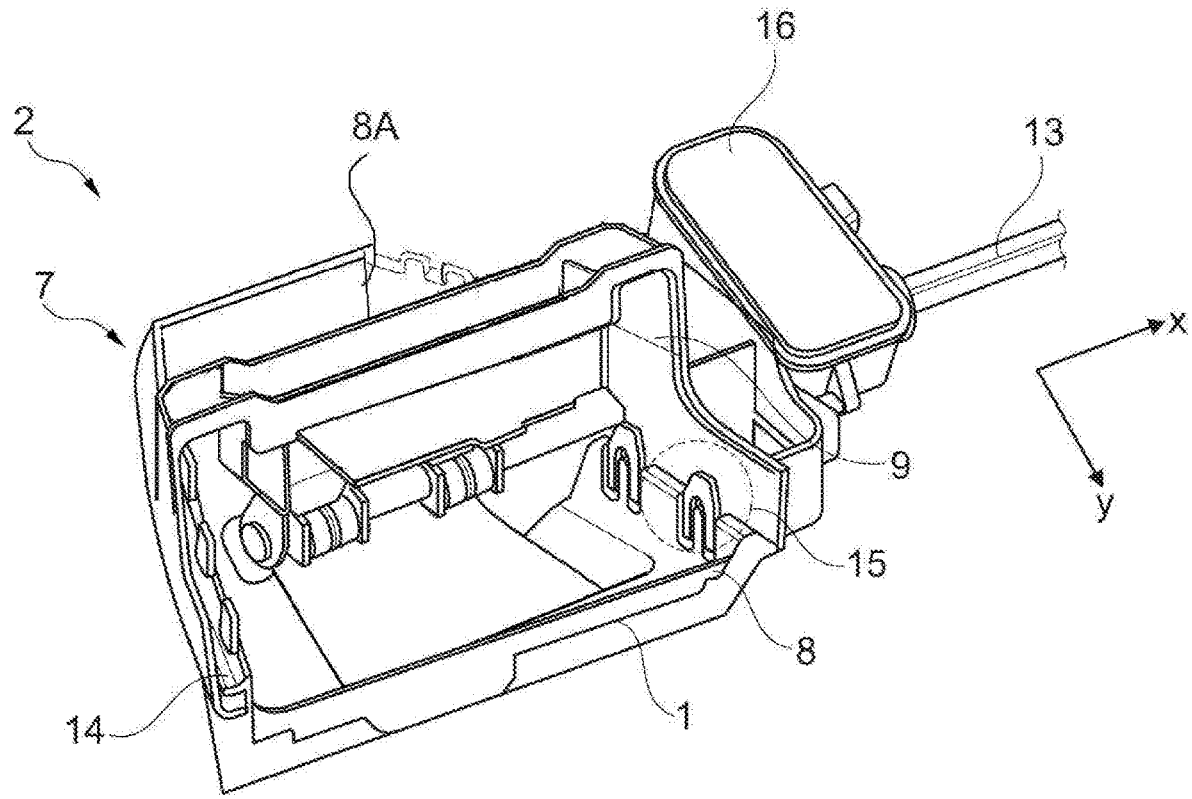
Figure 3:
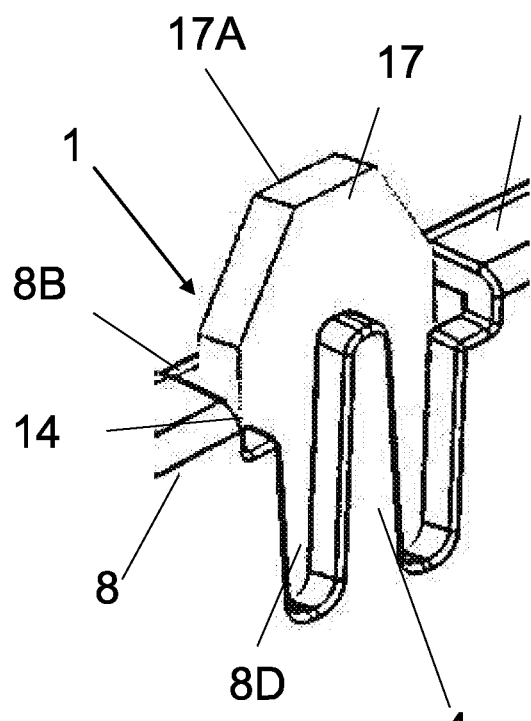
Figure 4:
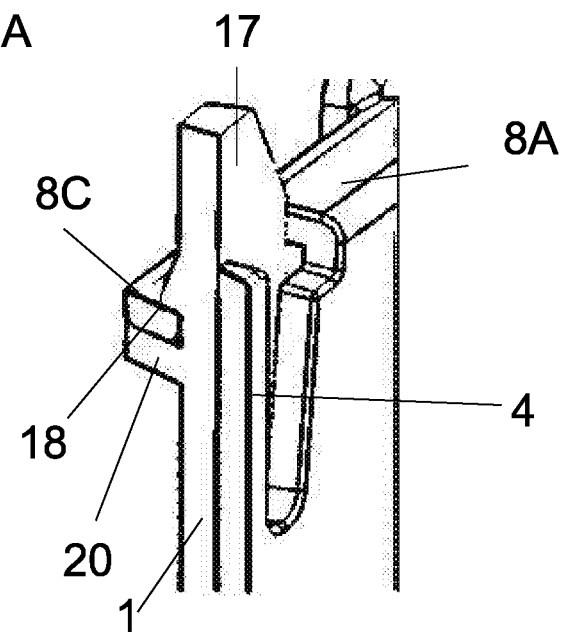
Figure 5:
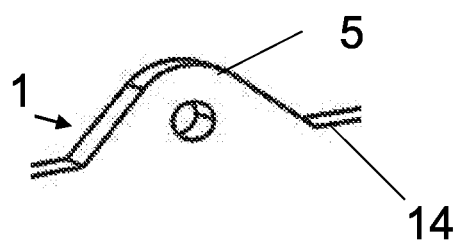
Figure 6:
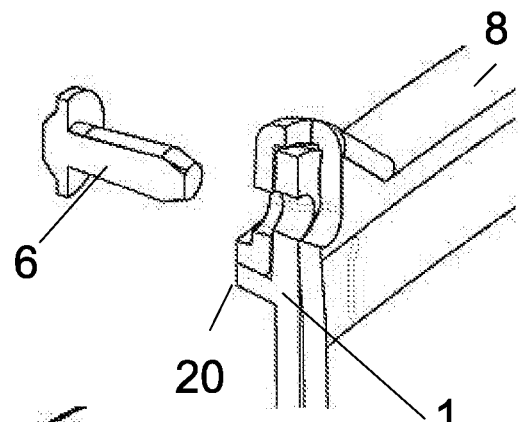
Figure 7:
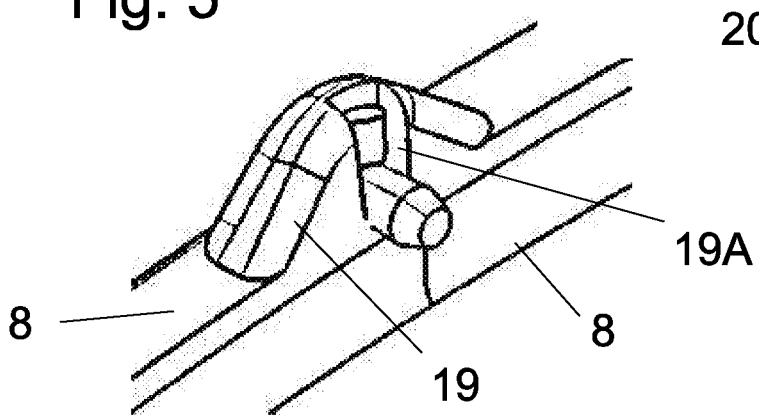

The present invention is represented by the detailed description and the associated drawings, wherein:

FIG. 1 shows a side view of a vehicle comprising an active wheel air deflector arrangement in an extended position, FIG. 2 is a perspective view of an active wheel air deflector arrangement, FIG. 3 and FIG. 4 show a first embodiment of a connection, FIGS. 5 and 6 and 7 show a second embodiment of a connection.

DESCRIPTION OF THE INVENTION

FIG. 1 is a side view of a vehicle comprising a front wheel 11. A wheel air deflector 1 is schematically illustrated, which extends underneath the bumper in the direction of the front wheel 11 and is mounted, swivelably about the x-axis, at the body or at supporting components of the vehicle body. The activated condition is represented in FIG. 1. In the deactivated condition, the wheel air deflector disappears in the vehicle and no longer narrows the ground clearance of the vehicle.

The wheel air deflector 1 is designed as a flow body, as shown, for example, in WO 2017/153 662 A1. The wheel air deflector is designed, in this example, as a body comprising a circular sector surface for the oncoming flow and is swivelable about a transverse axis, which corresponds to a boundary of the flow body, and is nondetachably mounted in a holder.

In FIG. 2, a part of the wheel air deflector system 2 for a wheel is schematically represented. The entire system consists of two wheel air deflectors 1 comprising swivelable holders 7 for the wheel air deflectors 1 and at least one actuator 16 and, if necessary, a shaft 13.

In this example, the holder 7 is formed from a base 8, which is flat but structured and is provided with edges, and at which arms 9 engage. The arms 9 are connected to a shaft 13. With the aid of the shaft 13, the entire holder 7 is twisted about the axis of the shaft 13 and the wheel air deflector 1 attached thereto is swiveled. The attachment 15 of the wheel air deflector 1 at the holder 7 takes place along the upper edge 14 of the cap-like flow body of the wheel air deflector 1, which, in the exemplary embodiment, has an approximately v-shaped contour of the upper edge 14.

The attachments 15 are distributed at multiple points of the holder 7 and reversibly connect the edge 8A of the base 8 to the wheel air deflector 1.

FIG. 3 and FIG. 4 show a first embodiment of the attachment 15.

In FIG. 3, the base 8 of the holder 7 comprising its edge 8A is represented. Recesses 8B are formed in this edge 8A, wherein a ridge 8C is formed on the one side of the recess 8B and an integrated spring 4 is formed on the other side of the recess 8B. The integrated spring 4 has the shape of a tongue and is formed by two slot-like notches 8D.

A tab 17 of the wheel air deflector 1 is slid into the recess 8B. The tab 17 comprises, as represented in FIG. 4, a projection 18, which protrudes over the ridge 8C of the edge 8A of the base 8. Upon insertion of the tab 17 into the recess 8B of the edge 8A, the tab 17 latches with the base 8 of the holder 7 via its projection 18 and a stop 20 under the pressure of the integrated spring 4. The tab 17 can be unloaded by pressing onto its tip 17A in the direction of the integrated spring 4. The tip 17A of the tab 17 is beveled on both sides for better centering and insertion.

With this configuration, it is possible to very securely connect the wheel air deflector 1 along the contour 14 of the wheel air deflector to the holder, specifically to the base 8.

The detachment is also easily possible and allows for the replacement of the wheel air deflector 1.

FIGS. 5 through 7 show an alternative embodiment of the attachment 15 of the wheel air deflector at the holder 7. Perforated tabs 5 are provided at the wheel air deflector 1 at multiple points along the upper edge 14. Curved seats 19 are provided on the edge 8A of the base 8, which are designed in such a way that the perforated tabs 5 can be accommodated. The wheel air deflector 1 is pushed with its perforated tabs 5 into the curved seats 19, wherein these comprise elongate slots 19A. When the wheel air deflector 1 has been inserted sufficiently far into the curved seats 19, wherein it also comprises a stop 20, the hole of the perforated tab 5 corresponds to the slot 19A of the curved seat 19. An expanding rivet 6 is introduced into the hole of the perforated tab 5, which fixedly connects the two components to one another, but is removable.

For the attachment of the wheel air deflector, the two alternative embodiments can also be mixed with one another.

LIST OF REFERENCE NUMBERS

1 wheel air deflector
2 active wheel air deflector arrangement
3 detent hook
4 integrated spring
5 perforated tabs
6 expanding rivet
7 holder
8 base
8A edge
8B recess
8C ridge
8D notch
9 arm
10 vehicle
11 front wheel
13 shaft
14 upper edge
15 attachment
16 actuator
17 tab
17A tip
18 projection
19 curved seat
19A slot
20 stop

What is claimed is:

1. An active wheel air deflecting arrangement for the attachment to a motor vehicle, which comprises at least one actuator, wheel air deflectors for the front wheels of the motor vehicle, and swivelable holders for the wheel air deflectors, wherein each of the holders includes a base that is generally flat and includes edges at which arms engage, the arms being connected to a shaft such that the holder is swiveled with the aid of the shaft about an axis of the shaft, wherein each of the wheel air deflectors is reversibly attached to one of the holders and is swiveled with one of the holders, wherein each of the holders defines at least one recess, wherein each of the air deflectors includes at least one attachment piece removeably received by the at least one recess, and wherein each of the holders includes a ridge on a first side of the at least one recess and a spring on a second side of the at least one recess opposite the first side of the recess, each for engaging the at least one attachment piece for holding the at least one attachment piece in place to connect the holder and the wheel air deflector.

2. The active wheel air deflector arrangement as claimed in claim 1, wherein the at least one attachment piece is located along an upper edge of one of the wheel air deflectors.

3. The active wheel air deflector arrangement as claimed in claim 1, wherein each of the holders presents a ridge at the edge of the base, and wherein each of the attachment pieces includes a projection and a stop spaced from the one another for being positioned on opposite sides of the ridge when the attachment piece is received in the holder for latching the attachment piece in place.

4. An active wheel air deflecting arrangement for the attachment to a motor vehicle, the active wheel air deflecting arrangement comprising at least one actuator, wheel air deflectors for the front wheels of the motor vehicle, and swivelable holders for the wheel air deflectors, wherein each of the holders includes a base that is generally flat and includes edges at which arms engage, the arms being connected to a shaft such that the holder is swiveled with the aid of the shaft about an axis of the shaft, wherein each of the wheel air deflectors is reversibly attached to one of the holders and is swiveled with one of the holders, wherein each of the wheel air deflectors includes perforated tabs at an upper edge of the wheel air deflectors, and wherein a plurality of curved seats which define elongate slots project upwardly from the edges of the base of each of the holders for being aligned with the perforated tabs for receiving fasteners to connect the perforated tabs of one of the wheel air deflectors and the curved seats of one of the holders.

5. The active wheel air deflector arrangement as claimed in claim 4, wherein the fasteners are each expanding rivets each for being inserted through one of the holes of the perforated tabs and one of the slots of the curved seats.

6. An active wheel air deflecting arrangement for being attached to a motor vehicle, the active wheel air deflecting arrangement comprising:
   at least one air deflector for at least one front wheel of the motor vehicle;
   at least one holder being pivotable for holding and pivoting the at least one wheel air deflector, the at least one holder defining at least one recess;
   the at least one air deflector including at least one attachment piece removeably received by the at least one recess of the holder; and
   the at least one holder including a ridge on a first side of the recess and a spring on a second side of the recess opposite the first side, each for engaging the at least one attachment piece for holding the at least one attachment in place to connect the at least one air deflector to the at least one holder.

7. The active wheel air deflector arrangement as claimed in claim 6, wherein an actuator is coupled with the at least one holder and provides pivoting movement of the at least one holder and air deflector.

8. The active wheel air deflector arrangement as claimed in claim 7, wherein a shaft is coupled with the actuator and the at least one holder and is rotatable along an axis for transmitting rotary movement about the axis from the actuator to the at least one holder.

9. The active wheel air deflector arrangement as claimed in claim 6, wherein the at least one holder includes a base being substantially flat and includes at least one edge extending transversely from the base, and wherein the at least one recess is defined along the at least one edge.

10. The active wheel air deflector arrangement as claimed in claim 9, wherein the at least one holder includes at least one arm connected to the edge, and wherein the shaft is connected to the at least one arm.

11. The active wheel air deflector arrangement as claimed in claim 6, wherein the at least one attachment extends from an upper edge of the at least one wheel air deflector.

12. The active wheel air deflector arrangement as claimed in claim 6, wherein the at least one recess includes a plurality of recesses spaced apart from one another along the at least one holder, and wherein the at least one attachment piece includes a plurality of attachment pieces spaced from one another along the at least one air deflector each for being received by one of the recesses of the plurality of recesses.

13. The active wheel air deflector arrangement as claimed in claim 6, wherein the at least one attachment piece defines a projection and a stop in spaced relationship with one another for engaging opposite sides of the ridge for latching the attachment piece in place.

14. The active wheel air deflector arrangement as claimed in claim 6, wherein the at least one holder defines a pair of notches on opposite sides of the spring.

\* \* \* \* \*